United States Patent [19]

Tsuji

[11] Patent Number: 5,308,668
[45] Date of Patent: May 3, 1994

[54] MULTILAYER FILM MADE OF SYNTHETIC RESIN

[75] Inventor: Shigeru Tsuji, Toyonaka, Japan

[73] Assignee: Kuriron Kasei Ltd., Osaka, Japan

[21] Appl. No.: 86,377

[22] Filed: Jul. 6, 1993

Related U.S. Application Data

[63] Continuation-in-part of Ser. No. 698,777, May 13, 1991, abandoned.

[30] Foreign Application Priority Data

May 14, 1990 [JP] Japan .................................. 2-124488

[51] Int. Cl.⁵ ........................ B32B 27/32; B65D 65/28
[52] U.S. Cl. .................................... 428/43; 428/412; 428/476.1; 428/516; 428/520; 428/913
[58] Field of Search .................... 428/516, 412, 476.1, 428/520, 43

[56] References Cited

U.S. PATENT DOCUMENTS 4,147,827 4/1979 Breidt, Jr. ........................... 428/519

Primary Examiner—P. C. Sluby
Attorney, Agent, or Firm—Wenderoth, Lind & Ponack

[57] ABSTRACT

A multilayer film made of synthetic resin is characterized in that at least one resin layer containing resins which have a poor compatibility with respect to each other and is composed of a mixture of two or more kinds of isomeric resins having a large difference in melting point. The isomeric resins provide easy-to-tear characteristics in a certain direction, where the resins form a numberless phases in certain directions within the resin layers.

3 Claims, 2 Drawing Sheets

MULTILAYER FILM MADE OF SYNTHETIC RESIN

This application is a continuation of now abandoned application, Ser. No. 07/698,777, filed May 13, 1991.

BACKGROUND OF THE INVENTION

1. Field of the Invention

This invention relates to a multilayer film and more particularly to a multilayer film made of synthetic resin which is used as a plastic film for packing, etc. and which can easily be torn in a certain direction.

2. Brief Description of the Prior Art

As conventional methods for manufacturing a multilayer film of this type, there are described methods for using a resin readily oriented in molecularly in the taking over film when the direction, is being manufactured by extrusion such as a high density polyethylene. This high density polyethylene is conventionally present as a part of the layers forming a multilayer film structure. In order to decrease a so-called blow ratio so that the film can easily be torn in the taking-over direction (vertical direction) and after the film is formed in a membranous form, it is stretched to orient molecules thereof so that the film can easily be torn. Also, a method is already practiced in which a multi-layer film having easy-to-tear characteristics is manufactured by laminating an easy-to-tear film manufactured by the above-mentioned method with other films.

However, even if a film, such as high density polyethylene, which is readily oriented molecularly in the taking-over direction, is used to decrease the blow ratio, the improvement in the easy-to-tear characteristic of a film in the vertical direction is generally insufficient and it is difficult to obtain a film which has an easy-to-tear characteristic sufficient enough to be practically useful. In the case of method wherein a film is stretched after it is formed in a membranous form so that the film can easily be torn in the vertical direction, it is not only required to employ a special apparatus for stretching film, but also the tearing strength in the vertical direction becomes too weak in general to offer an appropriate easiness of vertical tearing.

On the other hand, in the case of a method wherein an easy-to-tear film manufactured beforehand is attached to an other film, unless the tearing strength of the easy-to-tear film used as a raw material is weak enough, it is difficult to facilitate the tearing sufficiently to be practically effective owing to the tear resistance of the aforementioned other film in which it is attached. However, since this type of a weak film is very difficult in respect of attaching treatment, many problems must be overcome before it can be actually put into practice.

The present invention has been accomplished in order to obviate these problems inherent in the prior art.

SUMMARY OF THE INVENTION

It is therefore an object of the present invention to provide a multilayer film which is easily torn in a certain direction.

To achieve the above object, there is essentially provided a multilayer film made of synthetic resin characterized in that at least one resin layer has a poor compatibility with respect to each other and is composed of a mixture of two or more kinds of isomeric resins having a large difference in melting point, said isomeric resins an easy-to-tear characteristic in a certain direction where said resins form numberless phases in certain directions within said resin layers.

From another aspect of the present invention, there is essentially provided a method for manufacturing a multilayer film made of synthetic resin comprising coextruding a mixture of two or more kinds of isomeric resins having a large difference in melting point and another resin in a lamination form from a die, and cooling thereof to enhance hardening depending on difference in melting point, thereby providing an easy-to-tear characteristic in a taking-over direction of the film.

From still another aspect of the invention, there is essentially provided a method for manufacturing a multilayer film made of synthetic resin comprising either extruding a mixture of two or more kinds of isomeric resins having a large difference in melting point alone or coextruding the same together with other resins in a lamination form from a die to form a film, laminating said film with another film composed of a resin known per se, and cooling thereof to enhance hardening depending on the difference in melting point, thereby providing an easy-to-tear characteristic in a taking-over direction of the film.

According to the present invention, by admixing two or more kinds of isomeric resins poor in compatibility and having a large difference in melting point, there can be obtained a film having easy to tear characteristics in a certain direction by orienting the isomeric resin phases and weakening the affinity at the phase interface, thereby making it easy to tear the film in a certain direction. This is a completely different principle of operation from that of the prior art. In the present invention, in order to make it possible to apply this principle to an actual plastic film, this principle is applied to a part of layers of a coextruded multilayer film or of an extruded laminate film, and by forming layers very easy tear, it is made possible to provide a multilayer film having a characteristic easy to be torn in a certain direction practically effective and having other useful physical properties. According to the present invention, by laminating layers of film made of resin having such excellent physical properties as, for example, gas blocking properties as a physical property of the film which is ordinarily difficult to tear with layers of film which are easily torn in the vertical direction, there can be obtained easy to tear characteristics. Also, by changing the ratio of mixture of resin in the easy-to-tear layers in the vertical direction and by changing the rate of the thickness of the layers in the whole layers of the multilayer film, the tearing strength in the vertical direction can be changed. Accordingly, the tearing strength can be adjusted such that the film can easily be torn as originally designed but which cannot be easily broken accidently. Furthermore, since the present invention can be put into practice without using any special facilities nor apparatus and by such a simple and easy way as to mix material resins directly using the conventional apparatus, the industrial significance is immense.

The above and other objects and further features of the present invention will become manifest to those skilled in the art by reading the detailed description of the embodiment with reference to the accompanying drawings.

BRIEF DESCRIPTION OF THE DRAWINGS

The figure are microscope photographs of film easily torn in the vertical direction according to Test Example 1.

DETAILED DESCRIPTION OF THE EMBODIMENT

Figure 1:
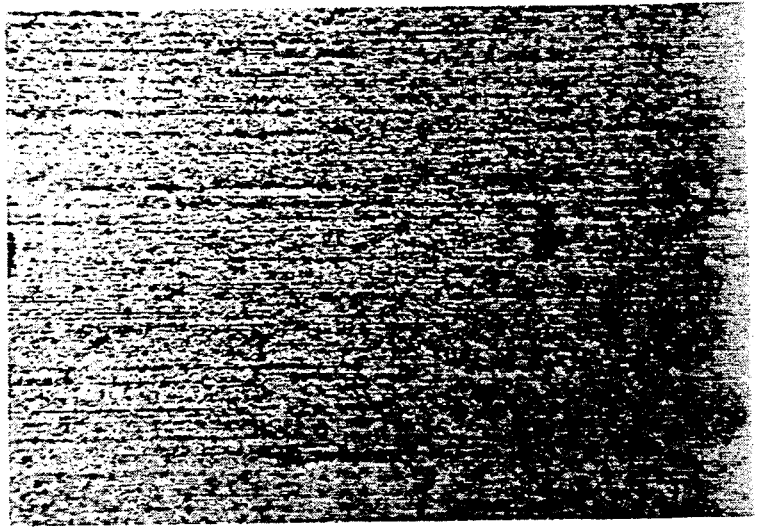
FIGS. 1 and 2 are photographs of the enlarged surfaces of resin showing the resin textures of film taken at indicated enlargement ratios, respectively.
Figure 2:
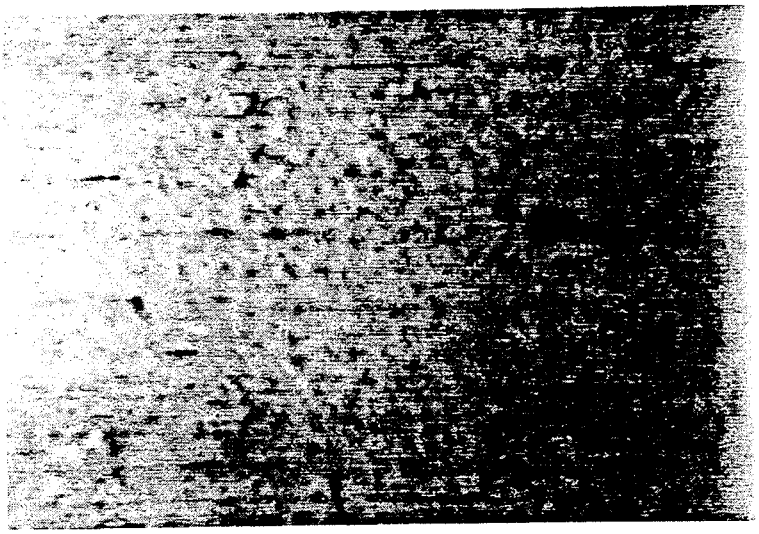
Figure 3:
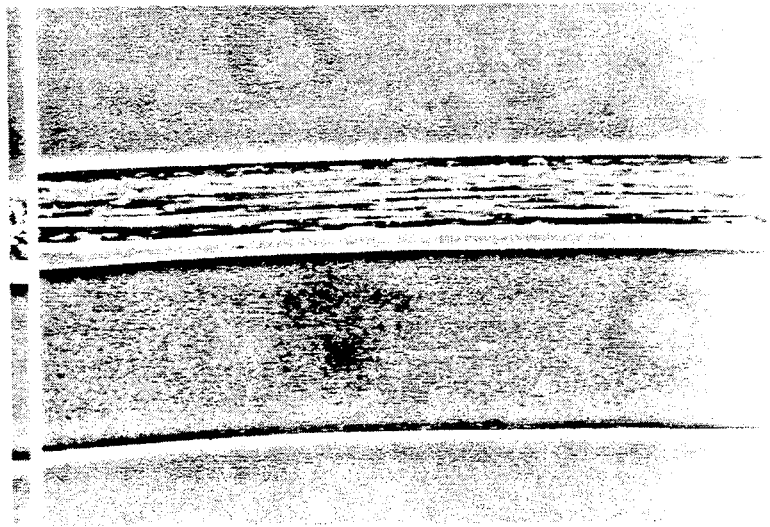
FIGS. 3 and 4 are enlarged sectional resin photographs showing the textures of resin of the film taken at indicated enlargement ratios in the TD-direction, respectively.
Figure 4:
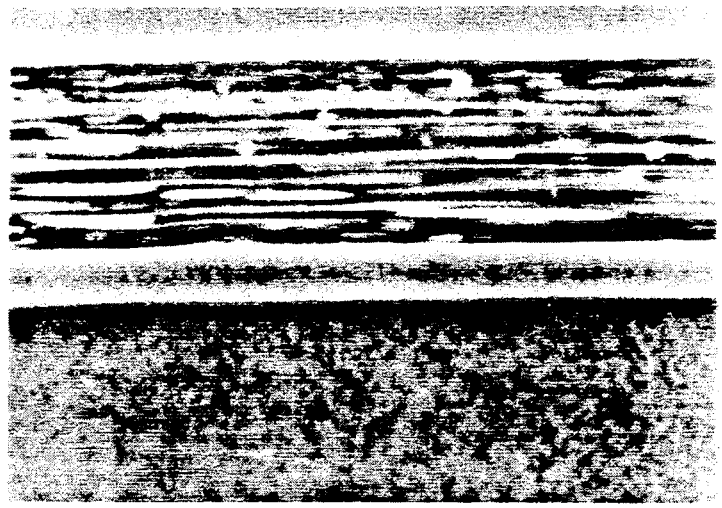
Figure 5:
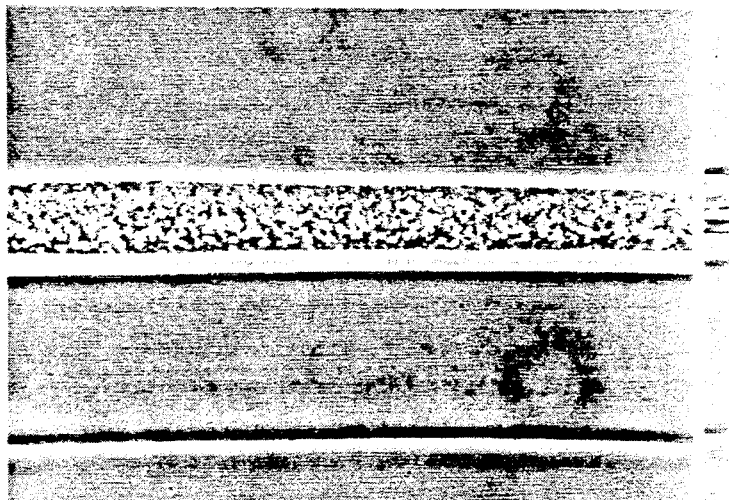
FIGS. 5 and 6 are enlarged sectional resin photographs showing the textures of resin of the film taken at indicated enlargement ratios in the MD direction, respectively.
Figure 6:
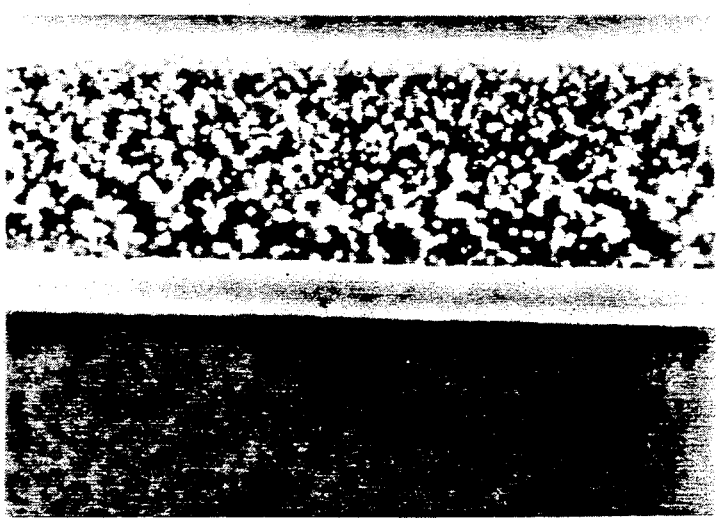

The embodiment of the present invention will be described hereinafter with reference to FIGS. 1 through 6.

When two or more kinds of resins having a poor compatibility and greatly different in melting point (hardening temperature) with respect to each other such as, for example, a nylon resin and a polyethylene resin are admixed and melted in a same extruding device, they are brought into an admixed molten state where the melting phases of the resins exist individually and such melting phases are admixed because the melting points of the resins are greatly different and the compatibility thereof is also poor. When this admixed molten resin is extruded into a die from the extruding device, the molten resin is stretched in the flowing direction within the die and a structure of different resin phases bundled in the flowing direction is formed in the molten body.

In general, when a plastic film is formed in a membrane form, a thinner film than the space of the outlet of the die is formed. Therefore, the molten body is further stretched in the taking-over direction at the outlet of the die and the molten body structure of the different resin phases bundled in the flowing direction is more emphasized.

When this molten body is cooled, the nylon portion having a higher melting point is hardened first and then the polyethylene portion having a lower melting point is hardened. As a result, a tube-like or sheet-like film (see FIGS. 4 and 6) having an internal structure of different resin phases long in the vertical direction and bundled in the taking-over direction is formed.

Since different resins poor in compatibility are bundled in the above-mentioned structure portion formed in the film and the timing for hardening is different, the mixing rate is small at the boundary between the different resins. As a result, the film is given such a structural characteristic as that the tearing strength in the vertical direction is very weak. As a consequence, the tearing strength also becomes small as a whole of the film having such a structural portion as mentioned.

If film having such structure is directly used as film of a single layer, the film is easily broken or cut off and problematical in practical use because the tearing strength thereof is too weak. In addition, since the physical property of film is fixed by the constituents of the mixture, it is impossible to meet various kinds of physical requirements. Also, even if an attempt for obtaining required physical properties by laminating other films therewith, the laminating process is difficult because the tearing strength is very weak. As seen in the foregoing, many difficulties are encountered in actual use, when an attempt is made to use film having the above-mentioned structure as one unitary body or to laminate such film with other films.

The present invention makes it possible to manufacture a multilayer film having such characteristics as to be easily torn in the taking-over direction of the film from the view point of practical use by forming a tube-like or sheet-like film including an easy-to-tear layer in the vertical direction having the above-mentioned structure by heat welding the easy-to-tear layer in the vertical direction having the above-mentioned structure with another phase by means of a so-called coextrusion method or extrusion laminating method.

The expression "two or more kinds of isomeric resins poor in compatibility and having a large difference in melting point" used herein refers to two or more kinds of resins comprising a combination of one or more kinds of resins among resins included in the group of "resins having a high melting point" with one or more kinds of resins among resins included in the group of "polyolefin resins" as will be described hereinafter.

The group of "resins having a high melting point" includes nylon (polyamide), polyester, polystyrene, polycarbonate, ethylene fluoride and the like. The term "nylon" used herein refers to such various kinds of nylons as 6-, 66-, 6-10, 10-, 11-, and 12-, copolymers containing, as a chief constituent, monomers composing these resins, mixtures of these resins, and the like. Examples of the "polyester" used herein include polyethylene terephthalate, and polybutylene terephthalate.

Examples of the group of "polyolefin resins" used herein include polyethylene, polypropylene, ethylene-propylene copolymer, the so-called adhesive polyolefine copolymer, that is, copolymer of olefin and another monomer which is used as an adhesive resin in the multilayer extrusion, and a mixture thereof.

The inventors of the present invention have studied hard about combinations and manufacturing conditions which can realize the present invention in a proper manner. As a result, it was found that in a mixture of resins having a good compatibility with respect to each other, it is difficult to form a molten body structure in which layers of isomeric resins are separately formed and admixed. If the mixing ratio is largely one-sided to one of the resins, a structure in which layers of isomeric resins are admixed is not sufficiently formed in the molten body. On the other hand, if resins having similar melting points are employed, separation of the isomeric resins becomes unsatisfactory at the boundary thereof because hardening progresses simultaneously when they are cooled. Therefore, in any one of the above cases, it is impossible to obtain a film having an easy-to-tear characteristic in the vertical direction which is good enough to be put into actual use. A combination of tearing layers of resins required for providing easy to tear characteristics which is practically effective, as well as the mixing ratios are as follows.

That is, in respect to a combination of resins useful because of the differences in compatibility and melting points, it is suitable to use, as a tearing layer, a combination of a nylon resin (a polyamide resin) as a polar resin having a high melting point with polyethylene resin as a non-polar resin having a low melting point. As described hereinbefore, the nylon used in the present invention includes such various kinds of nylons as 6-, 66-, 6-10, 10-, 11-, and 12-, copolymers containing, as a chief constituent, monomers composing these resins, mixtures of these resins, and the like. Examples of the polyolefin include polyethylene, polypropylene, ethylene-propylene copolymer, the so-called adhesive polyolefin copolymer, that is, copolymers of olefin and other monomers which are used as an adhesive resin in the multilayer extrusion, and a mixture thereof. The mixing ratio is different depending on kinds of resins and constitution of other layers in the multilayer structure, but it is required to be within a range of from approximately 5 to 95 wt % for nylon resin and preferably within a range of from 15 to 85 wt %.

The similar results will be obtained when polystyrene, polyester, polycarbonate, ethylene fluoride and the like are used instead of polyamide resin. Examples of the polyester used herein include polyethylene terephthalate, and polybutylene terephthalate.

It suffices that at least one easy-to-tear layer having such constitution as mentioned above exists in the multilayer structure. And the position of such easy-to-tear layer in the multilayer film is not particularly limited. In other words, the easy-to-tear layer may be in the outermost layer, the intermediate layer or the innermost layer. In any one of such cases, an easy-to-tear performance effective in practical use can be provided.

According to the present invention, in forming a multi-layer film by cooling various kinds of molten synthetic resins extruded in a lamination form from a die in the manner as mentioned above, a part of the layers, among layers forming the multilayer film, comprises a mixture of two or more kinds of resins having a poor compatibility with respect to each other and largely different in melting point, thereby making it possible to obtain a multilayer film having easy-to-tear characteristics in the taking-over direction of the film.

Also, there can be obtained a multilayer film composed of a single layer of or multilayer of molten resins extruded from a die superposed on another single layer of or multilayer of film, known per se, a part of layers among layers forming the extruded molten resins comprising a mixture of two or more kinds of resins having a poor compatibility with respect to each other and largely different in melting point, thereby enabling to provide an easy-to-tear characteristic in the taking-over direction of the film.

TEST EXAMPLE 1

Two films each having a three layer structure comprising an outermost layer, an intermediate layer and an innermost layer were manufactured using mixed isomeric resins of nylon and a low density polyethylene for the outermost layer, an adhesive polyethylene resin for the intermediate layer and a high density polyethylene for the innermost layer. At that time, the mixing ratios between the nylon and the low density polyethylene were 75:25 and 50:50 by wt %. Such manufactured films of three layer structure easy to be torn in the vertical direction were called a vertical tearing film 1a and a vertical tearing film 1b, respectively and compared with a film having a three layer structure in which nylon was used for the outermost layer and the same materials were used for the intermediate and innermost layers as the above (this film was called as the "ordinary film 1") in respect of tearing characteristics. Both films were 30/40/50 in ratio of thicknesses of the outermost, intermediate and innermost layers.

A cut was formed on each film in a direction parallel with the taking-over direction of the film, and the largeness of force (tearing strength) at the beginning of tearing operation and the tearing direction when the film was torn in a direction perpendicular to the taking-over direction of the film at 500 mm per minute of tearing force were measured. The results were as follows.

| Kind of films | Total thickness μ | Tearing strength Kg | Tearing direction |
| --- | --- | --- | --- |
| Ordinary film 1 | 90 | 2.6 | None |
| Vertical tearing film 1a | 90 | 1.8 | Yes (vertical tearing) |
| Vertical tearing film 1b | 90 | 1.7 | Yes (vertical tearing) |

TEST EXAMPLE 2

Two films each having a three layer structure comprising an outermost layer, an intermediate layer and an innermost layer were manufactured using mixed isomeric resins of nylon and a low density polyethylene for the outermost layer, an adhesive polyethylene resin for the intermediate layer and a high density polyethylene for the innermost layer. At that time, the mixing ratios between the nylon and the low density polyethylene were 75:25 and 50:50 by wt %. Such manufactured films of three layer structure easy to be torn in the vertical direction were called a vertical tearing film 2a and a vertical tearing film 2b, respectively and compared with a film having a three layer structure in which nylon was used for the outermost layer and the same materials were used for the intermediate and innermost layers as the above (this film was called as the "ordinary film 2") in respect of tearing characteristics. Both films were 10/20/70% in ratio of thicknesses of the outermost, intermediate and innermost layers.

And in the same procedure as in Test Example 1, these films were measured both in tearing strength and in tearing direction. The results were as follows.

| Kind of films | Total thickness μ | Tearing strength Kg | Tearing direction |
| --- | --- | --- | --- |
| Ordinary film 2 | 90 | 2.6 | None |
| Vertical tearing film 2a | 90 | 2.2 | None |
| Vertical tearing film 2b | 90 | 1.4 | None |

When the results of Test Example 1 and Test Example 2 are compared, it is known that the tearing strength and the tearing direction are largely different depending on the thickness of the easy-to-tear layer occupying in the whole layers. From the foregoing, it is also known that by properly adjusting the ratio of the thickness of the easy-to-tear layer, the tearing characteristic can be adjusted.

TEST EXAMPLE 3

A film having a three layer structure comprising an outermost layer, an intermediate layer and an innermost layer was manufactured using mixed isomeric resins in which nylon was mixed with polypropylene at 50:50 by wt % for the outermost layer, an adhesive polypropylene resin for the intermediate layer and a polypropylene for the innermost layer (this film was called as the "vertical tearing film 3"). This film 3 was compared with a film having a three layer structure in which nylon was used for the outermost layer and the same materials were used for the intermediate and innermost layers as the above (this film was called as the "ordinary film 3") in respect of tearing characteristics. Both films were 30/20/50% in ratio of thicknesses of the outermost, intermediate and innermost layers.

And in the same procedure as in Test Example 1, these films were measured both in tearing strength and in tearing direction. The results were as follows.

| Kind of films | Total thickness μ | Tearing strength Kg | Tearing direction |
| --- | --- | --- | --- |
| Ordinary film 3 | 80 | 2.6 | None |
| Vertical tearing film 3 | 80 | 2.1 | Yes |
|  | 80 | 2.1 | (vertical tearing) |

TEST EXAMPLE 4

A film having a three layer structure comprising an outermost layer, an intermediate layer and an innermost layer was manufactured using an adhesive polyethylene resin for the outermost layer, mixed isomeric resins in which nylon was mixed with polyethylene at 75:25 by wt % for the innermost layer, and an adhesive polyethylene for the intermediate layer (this film was called as the "vertical tearing film 4"). This film 4 was compared with a film having a three layer structure in which nylon was used for the outermost layer and the same materials were used for the intermediate and innermost layers as the above (this film was called as the "ordinary film 4") in respect of tearing characteristics. Both films were 30/20/50% in ratio of thicknesses of the outermost, intermediate and innermost layers.

And in the same procedure as in Test Example 1, these films were measured both in tearing strength and in tearing direction. The results were as follows.

| Kind of films | Total thickness μ | Tearing strength Kg | Tearing direction |
| --- | --- | --- | --- |
| Ordinary film 4 | 90 | 2.4 | None |
| Vertical tearing film 4 | 90 | 2.3 | Yes (vertical tearing) |

TEST EXAMPLE 5

A film having a two layer structure comprising an outermost layer, and an innermost layer was manufactured using mixed isomeric resins in which nylon was mixed with a low density polyethylene at 75:25 by wt % for the outermost layer and an adhesive polyethylene for the innermost layer (this film was called as the "vertical tearing film 5"). This film 5 was compared with a film having a two layer structure in which nylon was used for the outermost layer and the same material was used for the innermost layer as the above (this film was called as the "ordinary film 5") in respect of tearing characteristics. Both films were 30/70% in ratio of thicknesses of the outermost and innermost layers.

And in the same procedure as in Test Example 1, these films were measured both in tearing strength and in tearing direction. The results were as follows.

| Kind of films | Total thickness μ | Tearing strength Kg | Tearing direction |
| --- | --- | --- | --- |
| Ordinary film 5 | 90 | 2.6 | None |
| Vertical tearing film 5 | 90 | 1.8 | Yes (vertical tearing) |

TEST EXAMPLE 6

A film having a two layer structure comprising an outermost layer, and an innermost layer was manufactured using the same materials both for the outermost layer and the innermost layer as above, and in which the ratio in thickness of each layer was the same as above but the total thickness was 50μ and this film was attached with a low density polyethylene film of 30μ to manufacture a film of a three layer structure (this film was called as the "vertical tearing film 6"). This film 6 was compared with a film having a three layer structure in which nylon was used for the outermost layer and the same resin constitution was employed for the intermediate and innermost layers comprising an adhesive polyethylene and a low density polyethylene as the above such that the ratio of thickness is also the same as above (this film was called as the "ordinary film 6") in respect of tearing characteristics.

And in the same procedure as in Test Example 1, these films were measured both in tearing strength and in tearing direction. The results were as follows.

| Kind of films | Total thickness μ | Tearing strength Kg | Tearing direction |
| --- | --- | --- | --- |
| Ordinary film 6 | 80 | 2.6 | None |
| Vertical tearing film 6 | 80 | 2.0 | Yes (vertical tearing) |

A packing bag requires a sufficient amount of strength in view of practical use. If the tearing strength of a film is too weak, it gives rise to such a problem as that the packing bag is torn when the film is used for a packing bag. However, in case of the vertical tearing films manufactured according to the present invention and shown in the above-mentioned Test Examples, any one of them has a satisfactory tearing strength sufficiently to be used as an ordinary bag as long as no artificial vertical tearing action is made against the bag. Those films also have such characteristic as that they can very easily be torn in the vertical direction when an artificial tearing action is made against them.

As apparent from these Test Examples, a film of the present invention has a favorable vertical tearing characteristic in a certain direction and the tearing characteristic can be adjusted by changing the ratio of the thickness of total layers of the vertical tearing layers.

Although mixed layers of nylon and polyolefin were formed into a tearing layer by means of coextrusion in the above-mentioned Test Examples, a multilayer film having a similar tearing characteristic in a certain direction (taking-over direction) can also be obtained when a resin having a high melting point other than nylon is used and when the same kind of multilayer film as the above is manufactured by means of extrusion laminating method.

What is claimed is:

1. In a multilayer film comprising at least two resin layers which can be easily torn in one direction, the improvement wherein at least one of said two resin layers consists essentially of (a) polyolefin and (b) at least one member selected from the group consisting of nylon, polystyrene, polycarbonate and ethylene fluoride, which layer has a plurality of phases formed therein in a direction of said film being drawn out by extrusion to exhibit an easy-to-tear characteristic in the vertical direction, said resins (a) and (b), which make up at least one of the resin layers, having different melting points and being essentially incompatible when blended with each other.

2. A multilayer film according to claim 1 in which the remaining resin layers in the multilayer film is selected from the group consisting of polyethylene, polypropylene, high density polyethylene and high density polypropylene.

3. A multilayer film according to claim 1 in which all of the resin layers are made of the easy-to-tear resin combination (a) and (b).

* * * * *